INVENTOR.
GUENTHER W. LEHMANN
ATTYS.

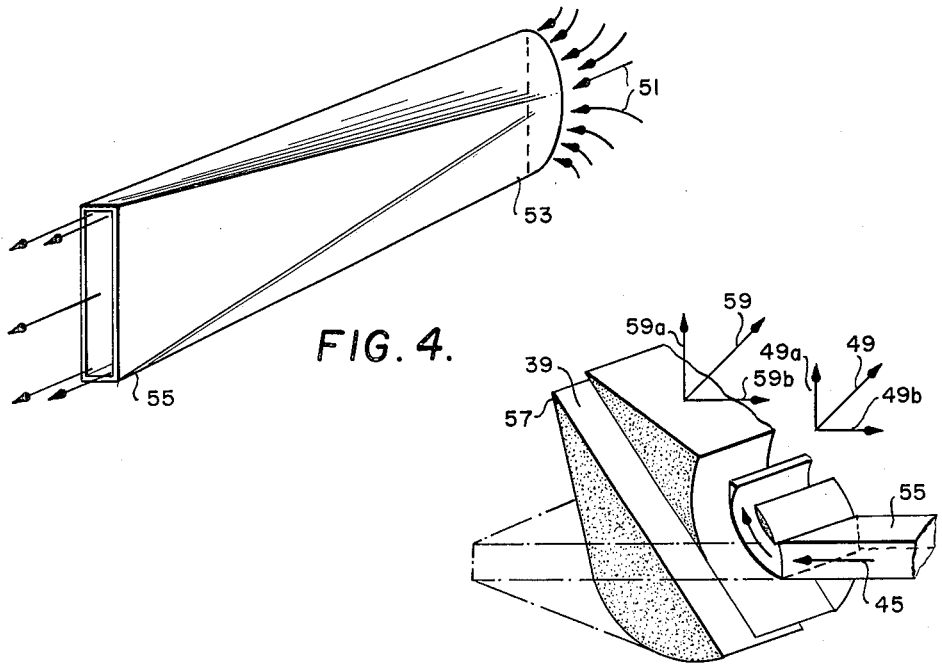
FIG. 4.
FIG. 5.
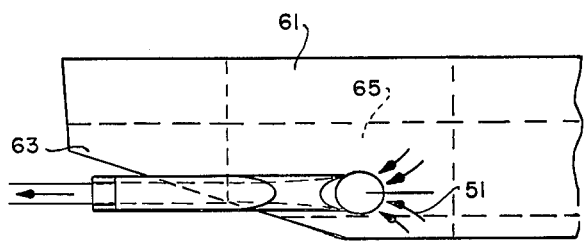
FIG. 6.
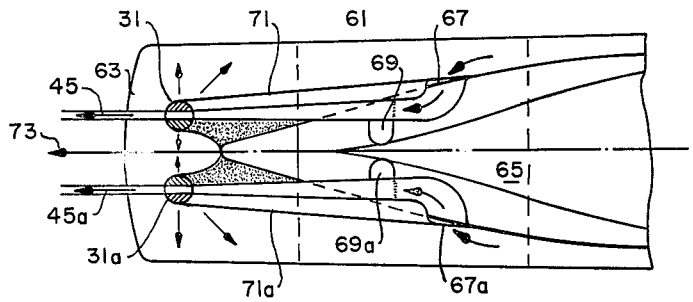
FIG. 7.

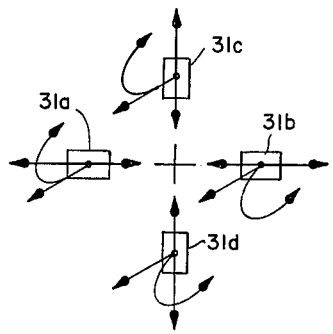
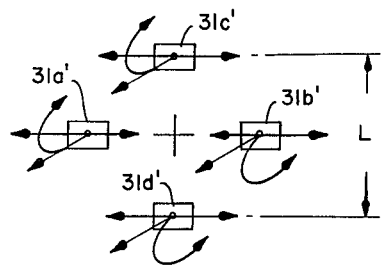
FIG. 8.  FIG. 9.
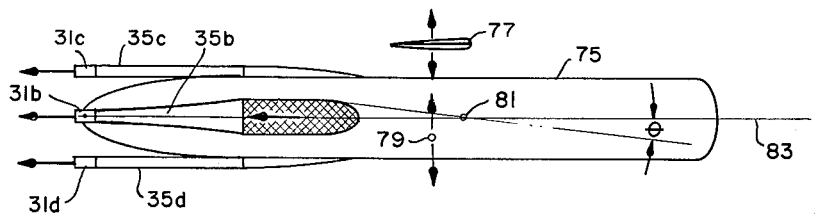
FIG. 10.
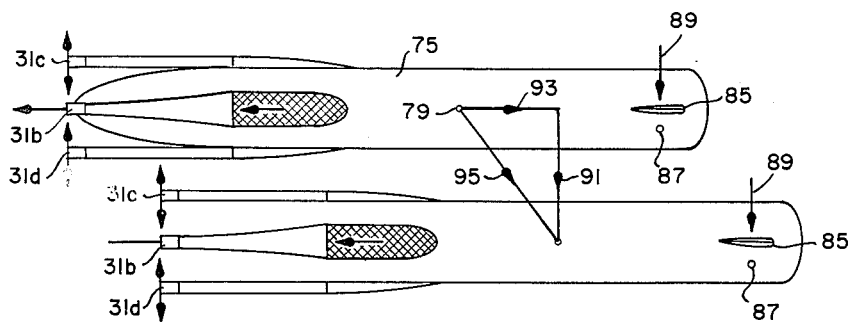
FIG. 11.

INVENTOR.
GUENTHER W. LEHMANN

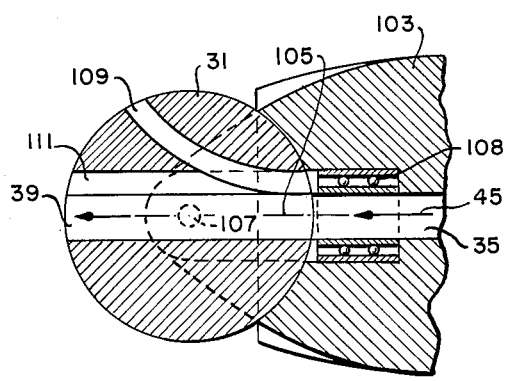
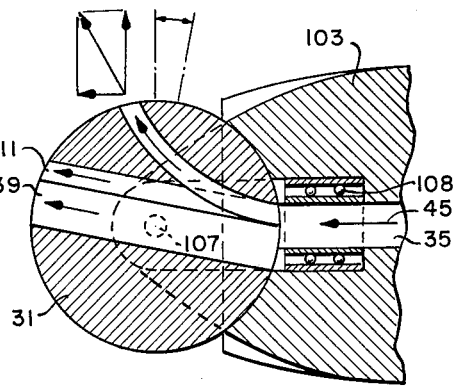
FIG. 15.   FIG. 15a.
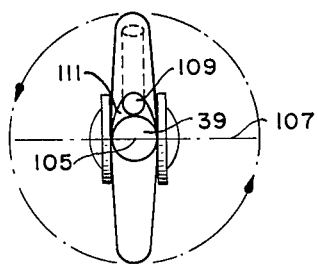
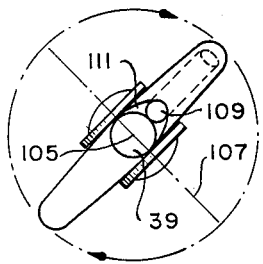
FIG. 16.   FIG. 16a.
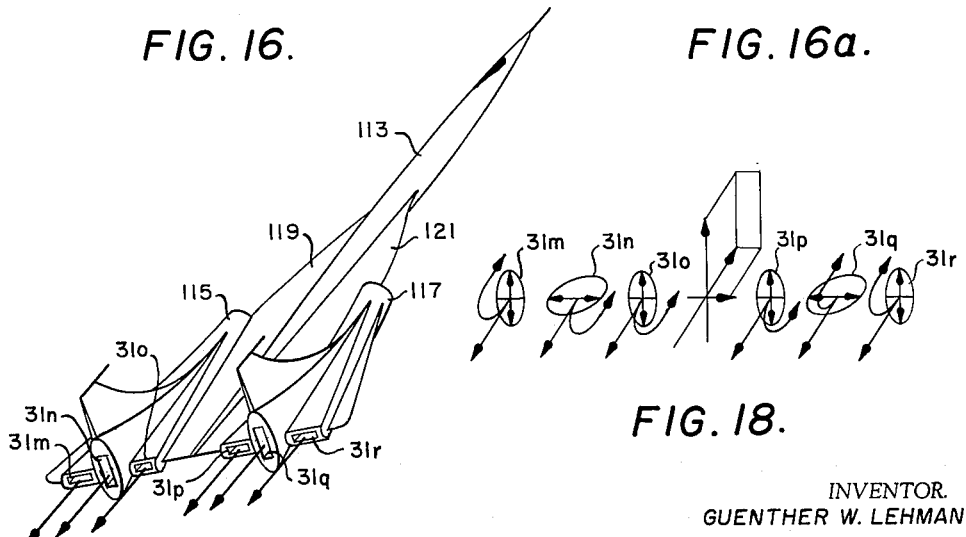
FIG. 17.   FIG. 18.
INVENTOR.
GUENTHER W. LEHMANN
ATTYS.

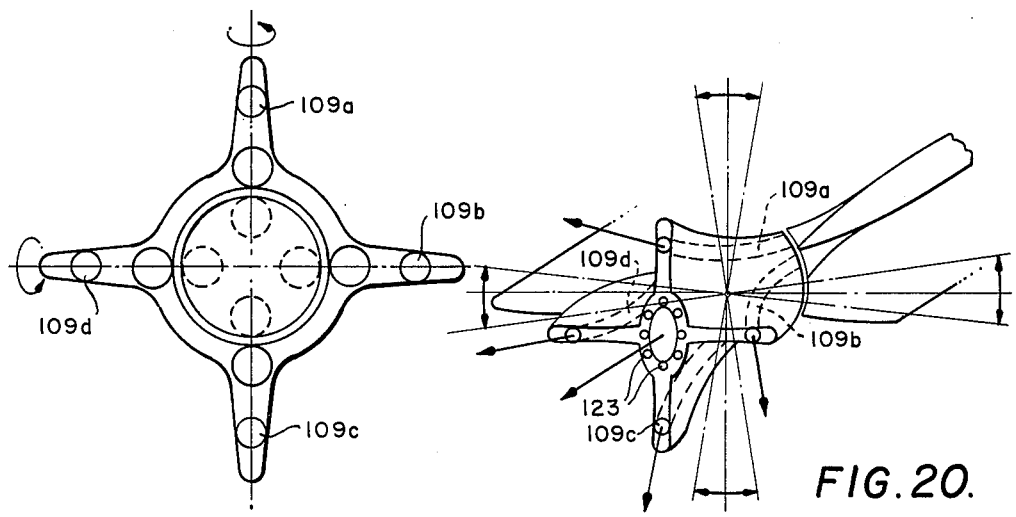
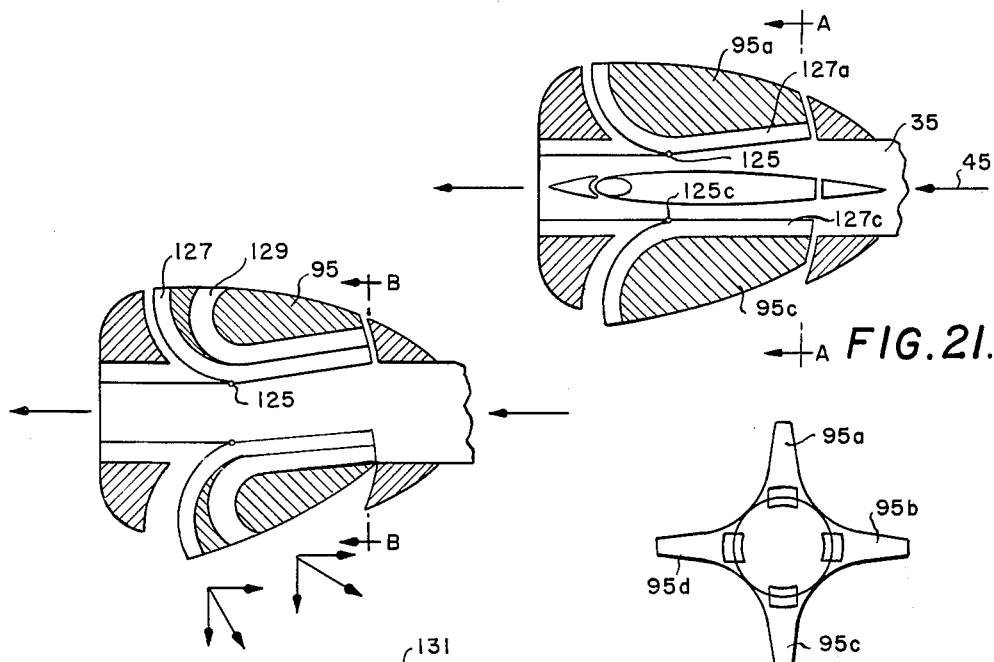

United States Patent Office 3,258,916
Patented July 5, 1966

3,258,916
JET STREAM STEERING AND CONTROLLING
MEANS
Guenther Wolfgang Lehmann, Annapolis, Md.
(140 W. Kalmira St., San Diego, Calif. 92112)
Filed Oct. 28, 1963, Ser. No. 319,618
18 Claims. (Cl. 60—35.55)

The invention described herein may be manufactured and used by or for the Government of the United States of America for governmental purposes without the payment of any royalties thereon or therefor.

The present invention relates to vehicular steering systems and more particularly to vehicular steering systems using jet propulsion principles. The term "vehicular" as used herein refers to both space and surface vehicles. By the term "space" is meant any medium in which a vehicle may proceed in a three-dimensional direction: e.g. underwater, air, or outer space. A "surface" vehicle operates at the boundaries of two media of different density; for example, a ship partly immersed in air and water.

Jet propelled vehicles are propelled by reaction forces whose counterparts are mass acceleration forces produced by a system which may comprise propelleds, turbines, compressors, and gas burning chambers, in combination with tubes and or ducts for producing and ejecting a continuous or intermittent accelerated jet stream mass. The masses to be accelerated may be taken entirely from the surrounding medium such as water, or in part, such as the case of airplanes where air is used in combination with fuels, or from masses entirely carried on board the vehicle such as fluids, chemicals or solid fuels to be processed to a gaseous state which, after acceleration by thermal processes, produce sufficient reaction forces to drive the vehicle.

Jet streams which are guided by ducts produce mass reaction forces acting in the axial direction of the discharge portion of the duct. Attempts have been made to divert the jet stream in order to generate transverse components which cause the vehicle to change its course. For example, a rotatable Kort nozzle, embracing a fixed positioned propeller, directs the propeller jet stream to the side resulting in a turning maneuver of the ship. Specially arranged flaps are utilized to reverse jet streams in airplanes for facilitating landing. Similar devices for diverting jet streams have been developed for aircraft with the intention of establishing a vertical takeoff before the plane assumes speed in the cruising direction. On space vehicles mechanical jet diverting techniques have been abandoned in favor of chemical jet diverting devices. One such system uses Freon which is injected into the jet stream, producing a shock wave with corresponding moment and force effects causing the missile to change its course. This system is very sensitive, reacting even to the smallest shock impulse.

Although various types of prior art jet steering systems have been operational, in many applications those systems which could provide maximum maneuverability were quite complicated and expensive besides being extremely heavy in situations where weight was an important consideration.

In accordance with the present invention the exhaust portion of a duct is used as a directional jet stream steering device by making it rotatable like the aforementioned rotatable Kort nozzle and providing it with additional and specially arranged channels for generating jet forces for maneuvering and backing operations whereby the steering mechanism as a whole is an integral part of the duct, fuselage, wing, or fin. The invention uses ducts and special arrangements at or within the vehicle whereby advantage is taken from the natural property of the jet stream with regard to its flexibility as to the configuration of the cross-section of a duct for inlet, guidance and ejection of the jet stream. A combination of a number of jet controlling devices is utilized to produce a special maneuvering effect.

It has been found that the ducts of jet streams need not necessarily be of a circular cross-section. A duct of any other cross section, for instance, oval, square, rectangular, hexagonal or combinations thereof may be used in certain applications. Although a duct of circular cross-section offers less frictional resistance and consequently a higher degree of efficiency than a square or rectangular section of the same cross-sectional area, in many instances a lower degree of efficiency may be acceptable if maneuverability or other desired performances can be greatly improved. In other words, improved properties for propelling a vehicle may be purchased by additional fuel. From the economical view point it is many times an advantage to sacrifice a small amount of fuel in order to produce the desired effect than to install an expensive machine to produce the same effect at lower fuel consumption. Weight-wise, the additional required fuel may not only be of less weight than the otherwise required machinery but also when that part of the fuel weight required due to smaller efficiency is consumed during operation, the vehicle becomes progressively lighter during continued operation, conversely, special machinery for producing the same effect constitutes a constant part of the vehicle's weight. In the long run, therefore, the difference in the weight of fuel which is required for increased maneuverability may in many instances be less than the weight of special maneuvering machinery.

Accordingly, it is an object of the present invention to provide a steering device for jet propelled vehicles which is simpler and lighter in weight than devices known heretofore for this purpose.

A further object is to provide a vehicular jet steering system which is more efficient than known jet steering systems.

Other objects and many of the intended advantages of this invention will be readily appreciated as the same becomes better understood by reference to the following detailed description when considered in connection with the accompanying drawings in which like reference numerals designate like or corresponding parts throughout the figures thereof and wherein:

FIG. 4 is a view in perspective of a duct for changing the cross-sectional shape of a jet stream;

FIG. 5 is a modified cross-sectional view of a streamlined, basically cylindrical duct of the general type illustrated in FIG. 1, shown in position for backing the vehicle on which it is mounted;

FIG. 6 is a longitudinal elevational, partly diagrammatic view of a jet duct with the jet steering and controlling device of FIG. 1 mounted on a surface ship;

FIG. 7 is a plan view of the embodiment shown in FIG. 6;

FIG. 8 is a schematical representation of four rectangular controlling devices with two devices in horizontal arrangement and two in vertical ararngement, shown with their respective forces;

FIG. 9 is a schematical representation of four rectangular jet controlling devices, all in horizontal arrangement, shown with their respective forces;

FIG. 10 is a view in longitudinal elevation of jet controlling devices installed on a submarine in accordance with the arrangement of FIG. 8;

FIG. 11 is a schematic view in longitudinal elevation of the use of the system shown in FIG. 10 in diving;

FIG. 15 is a cross-sectional view of a gimbal-supported jet controlling device applied to a jet airplane;

FIG. 15a is a view similar to that of FIG. 15 but with the control device in a maneuvering position;

FIG. 16 is an end view in elevation of the control device of FIG. 15;

FIG. 16a is a view similar to FIG. 16 but rotated in position about its longitudinal axis;

FIG. 17 is a perspective view of an aircraft embodying the control devices of the present invention;

FIG. 18 is a schematic representation of forces obtainable by the system shown in FIG. 17;

FIG. 19 is an end view of another embodiment of the control device of the invention built around the ejection portion of an airplane jet duct;

FIG. 20 is a view in perspective of the embodiment shown in FIG. 19;

FIG. 21 is a view in longitudinal cross-section along a main jet duct having four oscillatory fins with jet ducts for transverse forces;

FIG. 22 is a cross-sectional view of the embodiment shown in FIG. 21 taken along the line A—A of FIG. 21;

FIG. 23 is a longitudinal cross-section view along a main jet duct having four oscillatory fins with jet ducts for transverse forces and backing forces; and FIG. 24 is a cross-sectional view of the embodiment of FIG. 23 taken on the line B—B of FIG. 23.

Figure 1:
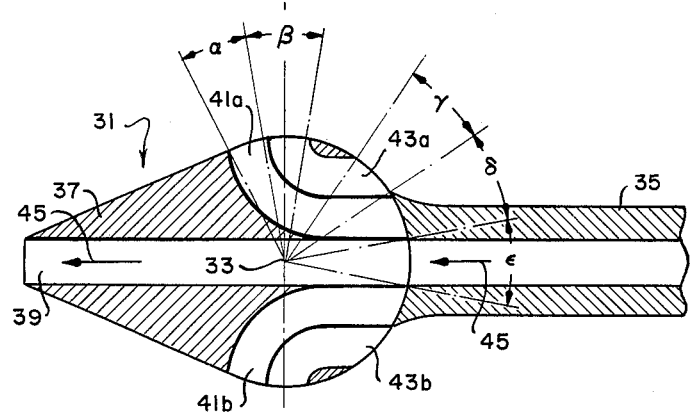
FIG. 1 is a cross-sectional view of a jet steering and controlling device made in accordance with the present invention in which the device is in its neutral position with the jet stream in the direction of a straight course for the vehicle.
Figure 2:
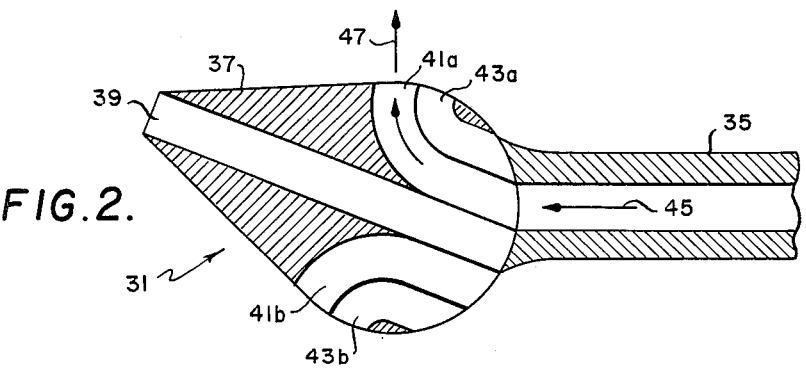
FIG. 2 is a cross-sectional view of the embodiment shown in FIG. 1 but positioned for producing a transverse jet reaction force for changing the course of the vehicle.
Figure 3:
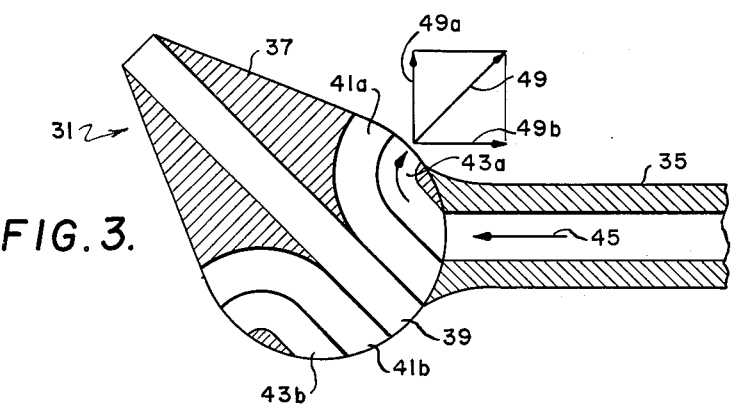
FIG. 3 is another cross-sectional view of the embodiment of FIG. 1 but positioned for producing jet stream forces for backing the vehicle.

Referring now to the drawings and particularly to FIGS. 1 through 3, there is shown in cross-section a jet controlling body shown generally at 31 which is pivotally mounted by any suitable means for rotation around a pivot axis 33. The jet stream controlling body 31 is mounted at the exit end of a jet duct 35 which may be part of any jet propelled vehicle. The body 31 in a particular embodiment of the invention is generally disc shaped having a streamlined after-portion 37. The circular forward portion is mated with a circular indentation at the end of the exit portion of the jet duct 35 to allow rotation of the controlling body about its axis 33 in close proximity to the end of the jet duct 35.

Provided within the controlling body 31 are a plurality of ducts 39, 41a, 41b, 43a and 43b which have adjacent ends at the forward portion of the body 31 adjacent the main jet duct 35 and are adapted to coincide therewith as the controlling body 31 is rotated about axis 33.

The neutral position of the controlling body is illustrated in FIG. 1. In this position a jet stream indicated by the arrows 45 passes from the main jet duct 35 through neutral duct 39 leaving the body 31 in a direction opposed to the direction of travel of the vehicle since the thrust produced by the jet is directly opposite its direction as it leaves the duct.

In FIG. 2 the controlling body 31 has been rotated to a maneuvering position. The turning duct 41a is now connected with the main jet duct 35 and directs the jet stream 45 in a transverse direction 47.

In FIG. 3 the controlling body 31 has been rotated still further so that the backing duct 43a is in position to receive the jet stream 45 from the main jet duct 35. The jet streams 45 is deflected by the curvature of the duct 43a so that it leaves the duct in a direction indicated by the arrow 49 which may be broken up into the two components: a transverse component 49a and a backing component 49b.

All of the ducts in the controlling body 31 have equal opening angles at the circular portion of the periphery of the body. This may be seen in FIG. 1 where angles $\alpha$, $\beta$, $\gamma$, $\delta$ and $\epsilon$ are all equal. The jet stream 45 enters and leaves the ducts in a radial direction depending upon the positioning of the body 31. Although FIGS. 1, 2 and 3 show the ducts of the control body 31 in exact correspondence with the main jet propulsion duct 35 it will be realized that as the body 31 is rotated intermediate positions will also be utilized. In such positions a portion of the jet stream will be carried by each of two ducts and the two ducts cooperate in producing a resultant transverse moment for control.

The controlling body 31 has been heretofore described as being generally disc shaped with a streamlined trailing portion. It is possible, however to build the controlling body 31 in the form of a sphere whereby the ducts 41 and 43 would assume the shape of annular rings. A spherical shaped controlling body has the advantage that it may be rotated around any of three axes thereby allowing direction of the jet stream in any direction. A spherical embodiment of the invention will be described in greater detail hereinafter. It will be realized that the streamlined end portion 37 of the controlling body 31, which assumes the form of a foil in the case of a disc or a cone in the case of a sphere, may be omitted if so desired.

The main jet duct 35 may be carried anywhere in the vehicle structure; for example, the fuselage or hull, a wing, or a fin. The only absolute requirement in mounting is that the structure on which the controlling body is to be mounted has sufficient strength to carry it and has sufficient thickness to cover the inlet of the neutral duct 39 when the controlling body is in its neutral position. In practice, pairs of controlling bodies should be used in a symmetrical arrangement in order to produce a resulting backing force in the centerline of the vehicle with equal plus and minus transverse components so that the vehicle does not swerve or rotate when the controlling system is brought into backing position. The transverse components 49a (FIG. 3) are then opposed to one another and cancel the effect of each other.

FIG. 4 shows a duct for changing the shape of a jet stream. For example, as is shown in this figure a jet stream indicated by arrows 51 enters the inlet end 53 of the duct and emerges from the outlet end 55. The inlet end 53 is shown as being oval-shaped in cross-section whereas the outlet end is rectangular in cross-section. The accelerated fluid mass leaving the duct also is rectangular in cross-section. If the exit end of the main jet duct is rectangular in cross-section, the steering and controlling body 31 takes the form of a cylinder having corresponding rectangular slots (FIG. 5). The streamlined after portion 37 of the controlling body modifies the cylinder to a wing or foil with the slot-shaped neutral duct 39 runing all the way through the wing or foil to its trailing edge 57. The controlling body 31 when operating in a fluid medium produces, in addition to the jet force 49, an additional force 59 which at extreme position may be broken down into a transverse force 59a and a backing force 59b. Thus, there is produced an effect similar to that of airplane wing flaps except that the jet stream controlling device and the landing flaps are integrated in the same structure, acting in unison to produce a greater effect than otherwise possible. In addition, gear and hydraulic controlling equipment are reduced.

The principles and structures hereinbefore pointed out are applicable to various types of vehicles.

Referring now to FIGS. 6 and 7 there is shown a ship's hull 61 having a raked stern 63 and a machinery space 65. The jet propulsion apparatus affixed to the hull 61 comprises water inlets 67 and 67a, fuel combustion chambers 69 and 69a, main jet ducts 71 and 71a and jet steering and controlling means 31 and 31a as have been described with reference to FIGS. 1 through 5. The jet propulsion plant as shown may be of the type which produces intermittent jet impulses, although any known type may be used.

The jet propulsion streams 45 and 45a may be directed by controlling means 31 and 31a in transverse directions for changing course or in rear directions for backing the ship as shown by the arrows emanating radially from the controlling means 31 and 31a. For backing operations both controlling means have to be operated to produce a resultant backing force along the centerline 73 of the ship.

In the case of a submarine, as may be best seen from FIGS. 8 through 14, four jet propulsion devices may be arranged at the stern in a symmetrical arrangement. A practical arrangement is to arrange four steerage and control bodies in pairs of two in the form of a cross as best shown in FIGS. 8 and 9.

In the embodiment of FIG. 8 two jet controlling bodies 31a and 31b are arranged with a vertical disc or cylinder axis with their ejecting jets positionable in the crusing direction, for backing and for horizontal turning meaeuvers. Two other jet controlling bodies 31c and 31d are arranged with a horizontal disc or cylinder axis with their ejecting jets positionable in the cruising direction, for backing and for diving operations as shown by the arrows. It will be noted that the transverse components of the backing forces are in the same plane so that the ship will not be caused to rotate.

The control array of FIG. 9 has pairs of controlling bodies 31a', 31b' and 31c', 31d' arranged similarly to those in FIG. 8.

The second pair 31c' and 31d', however, are also arranged with the disc or cylinder axis in the vertical direction. This configuration will not allow turning in the vertical plane for diving operations and creates an undesirable turning moment causing heeling of the ship around its longitudinal axis during backing operations. This moment is caused by the backing forces not acting in the same planes but instead the backing forces produced by the bodies 31c' and 31d' act at a lever arm of length L from one another. Accordingly, the arrangement of FIG. 9, although similar in some respects to that of FIG. 8 is undesirable.

FIG. 10 illustrates the application of the arrangement shown in FIG. 8 to a submarine hull 75 equipped with a diving control fin 77. The center of buoyancy of the submarine is indicated at 79 and the system center at 81. In diving operations from the water surface 83 by destroying buoyancy 79 the upper jet propulsion unit 35c is held temporarily out of service until the submarine becomes fully immersed and is diving at an angle θ controlled by the control fin 77.

If, as shown in FIG. 11, a bow fin 85 is provided or forward buoyancy 87 is destroyed in order to produce a vertical downward force 89, it is possible to submerge the submarine by parallel dislocation without the boat assuming a diving angle. This is accomplished by utilizing the jet controlling bodies 31c and 31d to produce vertical forces with a reverse trimming effect to counteract the force 89, the system center 79 thereby sinks at a speed 91 while proceeding forward at a speed 93 along a path 95 while the submarine submerges in level trim.

Figure 12:
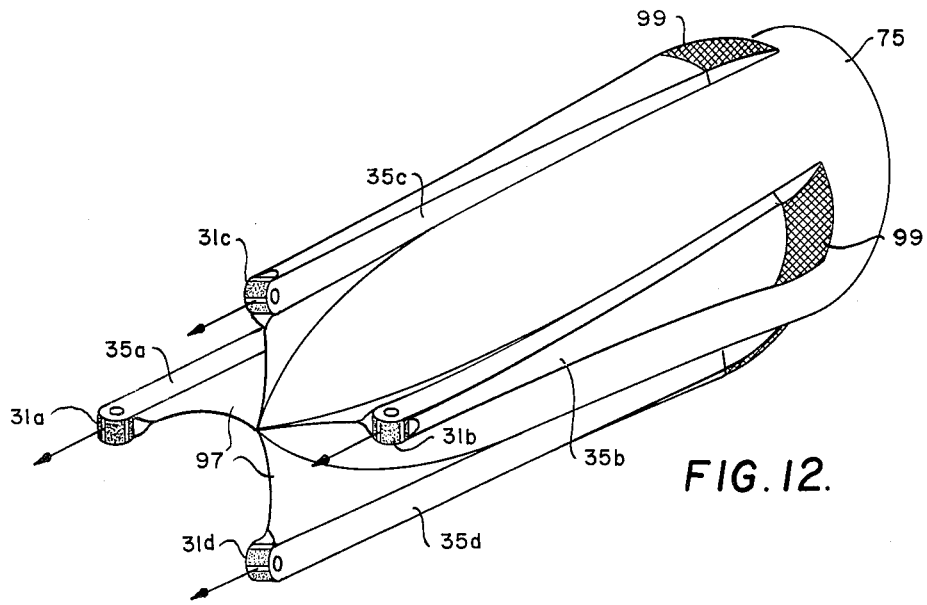
FIG. 12 is a perspective view of the jet propulsion unit of FIG. 10.

FIG. 12 shows in greater detail the aft portion of the submarine with the placement of the control bodies 31a, 31b, 31c and 31d as described with reference to FIG. 8 and FIGS. 10 and 11. The aft portion of the hull 75 is provided with skegs 97 for supporting the ducts 35a, 35b, 35c and 35d. Water enters these ducts through screens 99 which prevent debris from entering the jet system and the accelerated water leaves the ducts as jet streams indicated by the arrows.

Figure 13:
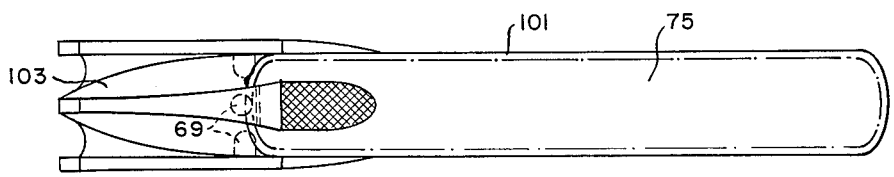
FIG. 13 is an elevational view of the embodiment of FIG. 10 showing the extent of the submarine pressure hull.

As shown in FIG. 13 the propulsion machinery 69 may, if desired, be mounted outside the pressure hull 101 in a free flooding hull space 103. An arrangement of this type aids in preventing leakage problems inherent where shafts and other movable elements must be passed through the pressure hull due to the main propulsion machinery being mounted inside the pressure hull.

Figure 14:
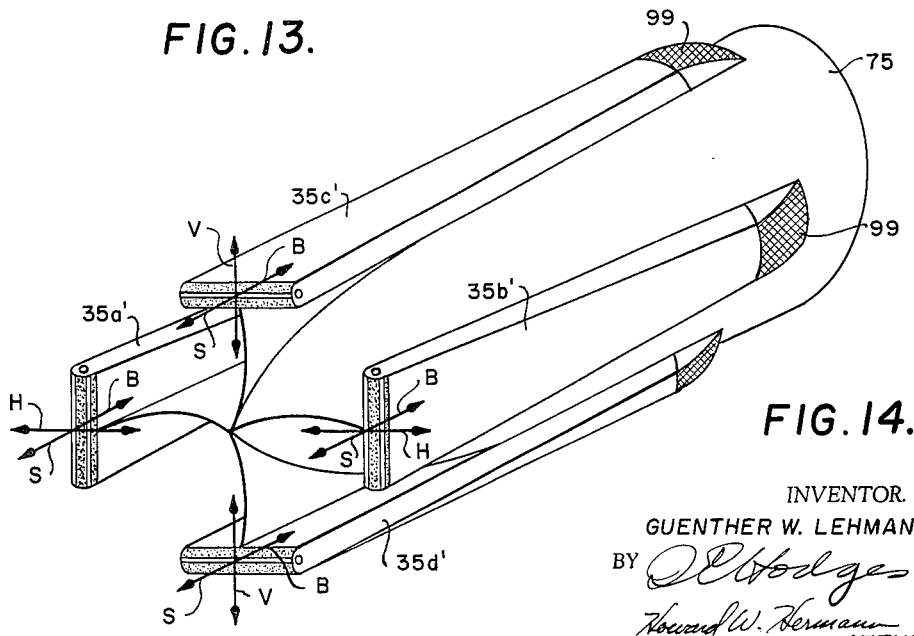
FIG. 14 is a perspective view of a modified embodiment similar in many respects to that of FIG. 12.

FIG. 14 is a modification of FIG. 12 wherein the jet streams produced are of an exaggerated rectangular shape. The purpose of FIGS. 12 and 14 is to demonstrate the free choice of the guide and of ducts along the shape of the hull and choice of change of cross-sectional shapes and areas, by example an oval inlet to a square-shaped or rectangular shaped aft section as design requirements may dictate. The ducts 35 may follow in part the contour of the aft portion of the hull if desired, although a straight axis of the jet duct is preferable.

Reaction forces can be produced in different planes and at angles to meet any maneuver requirement. As shown in FIG. 14, the submarine is propelled for cruising on a straight course by forces "S," horizontal forces "H" cause the submarine to turn in a horizontal plane, and vertical reaction forces "V" effect diving or surfacing maneuvers, which may be in conjunction with fins as hereinbefore described. For backing operations all four jet controlling bodies are put in backing position for producing backing forces "B."

Combinations of forces H and B may be used for quick reduction of cruising speed and execution of sharp turns. Thus, an extremely short turning radius can be realized even under high speed, which is an important feature in evading attack. Further, a submarine lying on the ocean bottom may be completely reversed on the spot without assuming forward speed. Such quick maneuvers cannot be accomplished with customary propeller and rudder systems or a combination of straight jet stream and rudders.

FIGS. 15 through 20 illustrate the application of the proposed jet steering and controlling devices to aircraft. In FIG. 15 there is shown a jet duct 35 which is built into the fuselage 103 of an airplane. A jet stream 45 passes through the duct 35 and into the controlling body 31. The controlling body 31 is shown as being mounted in a gimbal arrangement so as to be rotatable about two axes: a longitudinal axis 105 and a transverse axis 107. A bearing 108 may be provided for allowing rotation about axis 705. The body 31 may be a true sphere or alternatively may be a fin-shaped as shown in FIGS. 16 and 16a. Of course, a streamlined tail section may also be provided on the control body as was described in connection with FIGS. 1–3.

The controlling body 31 is provided with a neutral duct 39 and a single maneuvering duct 109 which has its intake end preferably mounted within an auxiliary neutral duct 111. When straight flight is desired, the neutral duct 39 is positioned coextensively with the exit end of the jet duct 35 of the aircraft. The jet stream 45 therefore passes from the control body in a direction directly opposed to the direction of flight travel. For maneuvering, the control body 31 is rotated about either or both of its axes so that the maneuvering duct 39 dips into the main jet stream 45 deflecting a portion of the jet stream 45 and direct it into the proper direction to produce a turning movement in the desired direction. It will be realized that the controlling body 31 can be rotated in any direction to produce turning movements horizontally, vertically, or in any direction in between.

When the maneuvering duct 109 is dipped in the jet stream 45 is will be realized that the neutral duct 39 dislocates with respect to the main jet duct 35. Therefore, the auxiliary neutral duct 111 allows a continuous flow out of the controlling body 31 of that portion of the jet stream 45 which is not deflected through the maneuvering duct 109. At neutral positioning of the controlling body 31, the jet stream 45 is carried exclusively by the neutral duct 39.

Referring now to FIGS. 17 and 18, a delta-winged airplane 113 is equipped with a pair of jet propulsion systems 115 and 117 mounted within wings 119 and 121, respectively. Each of the jet propulsion systems is equipped with jet steering and control bodies as heretofore described with reference to FIGS. 1–3. In each system there is provided a center control body having a vertical axis and a pair of control devices pivotal about a horizontal axis. The six respective jet controlling bodies 31 (*m* through *r*) are able to produce the forces illustrated in the diagram of FIG. 18.

As may be observed from FIG. 18 all of the control devices may be utilized to produce straight thrust forces in the forward direction. Vertical forces in either direction may be produced by the units 31*m*, 31*o*, 31*p*, and 31*r* while transverse forces may be produced by units 31*n* and 31*q*. Backing forces may be produced by all of the control bodies when they are positioned as shown in FIG. 3. Since the system is symmetrical the plus and minus transverse and vertical components, when the units are in backing position, are eliminated producing a resultant backing force in the center of the system with no moments present.

In FIGS. 19 and 20 is shown a simplified embodiment of the type of system shown in FIGS. 15 and 16. In this embodiment four maneuvering ducts 109*a*, 109*b*, 109*c* and 109*d* are provided four streamlining bodies so that the controlling bodies need only be rotated to a small degree in order to produce a transverse force in any direction. The system is not designed for backing. A plurality of auxiliary ducts outlets 123 are provided similar to the auxiliary duct 11 of FIG. 15 for the same purpose; i.e. assuring a continuous flow from the main jet when the control device is tipped to allow the maneuvering jets to communicate with the main jet. The embodiment shown in FIGS. 19 and 20 has the advantage that maneuverability is increased while the requirement for extensive hydraulic equipment for rotating the controlling bodies is reduced.

Still another embodiment of the invention is shown in FIGS. 21–24. As shown in FIGS. 21–22, rotatable fins or discs 95*a-d* are arranged at the end of a main propulsion duct 35 and are pivotable about fulcrums 125*a-d*, respectively. For producing a straight aft jet propulsion stream the fins 95*a-d* are all positioned as shown by fin 95*a* in FIG. 21. When it is desired to create a transverse force the proper fin is rotated about its axis 125 into the position shown at 95*c* in FIG. 21 whereby the maneuvering duct 127 located in that fin is moved into the jet propulsion stream 45 so that a portion of the jet stream is deflected to produce turning moment.

The fins 95 may also be equipped with a backing duct 129 as shown in FIGS. 23 and 24 whereby a further rotation of the body 95 places the backing duct 129 in the jet stream thereby producing a backing moment as indicated by the arrows on FIG. 23.

A special feature for the duct layout is indicated in FIG. 24. The intake ends of the ducts are dipped into the main duct sufficiently to occupy the entire cross-section of the main duct so that the entire jet stream 45 is directed into the duct system of the fins when the fins are in backing position. This is best accomplished when the intake ends of the ducts have rectangular cross-sections and the exit end of the main jet duct is provided with a square or rectangular cross-section and preferably the ratio of length to width of 2:1. In FIG. 24 the fins are all shown in the backing position occupying the entire cross-sectional area of the main jet duct, with the dotted lines indicating their neutral position and the arrows showing their direction of movement to the neutral position. The line 131 indicates the shape of the housing.

While the invention has been described and illustrated in connection with certain embodiments thereof, it will be understood that various modifications and variations may occur to those skilled in the art, particularly in the light of the above teachings. It is therefore to be understood that within the scope of the appended claims the invention may be practiced otherwise than as specifically described.

What is claimed is:

1. Jet steering and controlling means for a main jet propulsion stream of a vehicle comprising in combination:
   rotatable jet stream guidance means located in fluid coupled relation to the jet main stream;
   said rotatable jet stream guidance means having a neutral steering position;
   said rotatable jet stream guidance means having first duct means substantially in line with the main jet stream for fluid coupling therewith when said guidance means is in a neutral steering position;
   said rotatable jet stream guidance means having second duct means adjacent said first duct means;
   the influx end of said second duct means being at least approximately immediately adjacent the intake end of said first duct means;
   the efflux end of said second duct means having at least a portion thereof located at an angle with reference to the direction of neutral jet stream;
   said angle being such that upon rotation of said guidance means to establish jet stream flow via at least a portion of said second duct means, a portion of the jet stream is directed via said second duct means to produce transverse thrust; and a third duct means, the influx end of said third duct means being at least approximately immediately adjacent the influx end of said second duct means, the efflux end of said third duct means having at least a portion thereof located, with reference to the direction of the neutral jet stream, at an angle greater than the angle of said efflux end portion of said second duct means.

2. A jet steering and controlling means as defined in claim 1 and wherein said efflux end of said third duct means is arranged to produce a forward efflux when said guidance means is rotated sufficiently for the influx end of said third duct means to be dipped into said main jet stream.

3. Jet steering and controlling means as defined in claim 2 wherein said guidance means is generally spherical in shape and gimbal mounted for rotation in any direction.

4. Jet steering and controlling means as defined in claim 2 wherein the housing of the first, second and third duct means is in the form of a disc with rectangular cross-sectional duct means.

5. Jet steering and controlling means as defined in claim 2 wherein the housing of the first, second and third duct means has the form of a cylinder rotatable around the cylinder axis.

6. Jet steering and controlling means as defined in claim 2 wherein the second and third duct means are mounted in the same plane and are symmetrical with respect to the center axis of the vehicle.

7. Jet steering and controlling means as defined in claim 2 wherein a single side fin is provided for housing said first and second duct means, said fin being mounted for rotation around the longitudinal axis of the vehicle with restricted movement in the longitudinal plane at any rotation angle.

8. Jet steering and controlling means as defined in claim 2 wherein said second and third duct means are annular.

9. Jet steering and controlling means according to claim 2 wherein four jet stream guidance means units are provided, symmetrically arranged about the central longitudinal axis of the vehicle, one unit in each quadrant, the axis of rotation of each unit being about a radial line of a circle having the central axis as an origin.

10. Jet steering and controlling means according to claim 2 wherein jet propulsion units are symmetrically located in position displaced from the longitudinal central axis of the vehicle;

each unit comprising in combination a central jet steering and control means with a first rotational axis and outer jet steering and control means located on both sides of said central means with their rotational axes being coaxial and in a plane at a right angle with said first rotational axis.

11. Jet steering and controlling means as defined in claim 1 wherein two fins are provided in respective longitudinal planes intersecting at a right angle, for housing said first and second duct means, the fins being rotatable for restricted movements in either and both said planes.

12. Jet steering and controlling means as defined in claim 11 further comprising in combination auxiliary duct means adjacent to said first and second duct means and parallel to said first duct means.

13. Jet steering and controlling means as defined in claim 12 wherein fairing bodies are affixed to said vehicle in front of said rotatable jet stream guidance means.

14. Jet steering and controlling means for a main jet propulsion stream of a vehicle comprising in combination:

jet stream guidance means having first duct means substantially in line with the main jet stream to provide neutral jet thrust;

said jet stream guidance means having second and third duct means;

said jet stream guidance means having rotatable means carrying at least the second and third of said duct means;

the influx end of said second duct means being immediately adjacent said first duct means and with the efflux end of said second duct means being angularly displaced from the efflux end of said first duct means;

whereby rotation of said rotatable means causing the interception of the main jet stream by the influx end of the second duct means produces transverse jet efflux;

the influx end of said third duct means being immediately adjacent the influx end of said second duct means, and the efflux end of said third duct means being arranged at an angle to the main jet stream such that upon sufficient rotation of the rotatable means to move the influx end of the third duct means into the path of the main jet stream, forward jet efflux is produced by the third duct means.

15. Jet steering and controlling means according to claim 14 wherein said rotatable means comprises:

a rotatably mounted housing for each quadrant of the main jet stream, each of said housings carrying a portion of said second and third duct means.

16. Jet steering and controlling means according to claim 14 wherein said rotatable means carries all of said duct means.

17. Jet steering and controlling means according to claim 14 wherein said second and third duct means are mounted symmetrically about the central axis of the vehicle.

18. Jet steering and controlling means according to claim 15 wherein the main jet stream is confined to a rectangular flow section and wherein the influx ends of each quadrantal portion of said second and third duct means are rectangular in cross section, the housing being rotatable to positions at which substantially all of the jet main stream is diverted into said second and third duct means.

References Cited by the Examiner

UNITED STATES PATENTS

| | | | |
|---|---|---|---|
| 3,063,394 | 11/1962 | Rebikoff | 114—16 |
| 3,112,616 | 12/1963 | Adamson | 60—35.54 |
| 3,145,531 | 8/1964 | Deutsch | 60—35.54 |

MARK NEWMAN, *Primary Examiner.*

FERGUS MIDDLETON, *Examiner.*

T. M. BLIX, R. D. BLAKESLEE, *Assistant Examiners.*